US006128027A

United States Patent [19]

DeBoer et al.

[11] Patent Number: 6,128,027

[45] Date of Patent: *Oct. 3, 2000

[54] CONTINUOUS TONE MICROFLUIDIC PRINTING

[75] Inventors: Charles D. DeBoer, Palmyra; Werner Fassler; Xin Wen, both of Rochester, all of N.Y.

[73] Assignee: Eastman Kodak Company, Rochester, N.Y.

[ * ] Notice: This patent is subject to a terminal disclaimer.

[21] Appl. No.: 08/868,426

[22] Filed: Jun. 3, 1997

[51] Int. Cl.$^{7}$ .................................................... G01D 15/16

[52] U.S. Cl. ......................................................... 346/140.1

[58] Field of Search .......................... 346/140.1; 347/43, 347/3

[56] References Cited

U.S. PATENT DOCUMENTS

| | | | |
|---|---|---|---|
| 5,023,625 | 6/1991 | Bares et al. | 347/48 |
| 5,140,339 | 8/1992 | Higuma et al. | 347/43 |
| 5,180,624 | 1/1993 | Kojima et al. | 347/105 |
| 5,473,350 | 12/1995 | Mader et al. | 347/7 |
| 5,585,069 | 12/1996 | Zanzucchi et al. . | |
| 5,593,838 | 1/1997 | Zanzucchi et al. . | |
| 5,603,351 | 2/1997 | Cherukuri et al. . | |
| 5,605,750 | 2/1997 | Ramano et al. . | |
| 5,606,351 | 2/1997 | Hawkins . | |
| 5,611,847 | 3/1997 | Guistina et al. . | |
| 5,745,128 | 4/1998 | Lam et al. | 346/140.1 |
| 5,771,810 | 6/1998 | Wolcott | 347/3 |
| 5,933,164 | 8/1999 | Sato et al. | 347/43 |
| 5,986,678 | 11/1999 | Deboer et al. | 346/140.1 |

OTHER PUBLICATIONS

Dasgupta et al., "Electroosmosis: A Reliable Fluid Propulsion System for Flow Injection Analyses", Anal. Chem. 66, pp. 1792–1798 (1994).

*Primary Examiner*—N. Lo
*Assistant Examiner*—Lamson D. Nguyen
*Attorney, Agent, or Firm*—Raymond L. Owens

[57] ABSTRACT

A method for microfluidic printing continuous tone color pixels on a reflective receiver by using cyan, magenta, and yellow inks including supplying a fourth, colorless ink along with the cyan, magenta, and yellow inks needed for color printing; pumping the inks through capillary microchannels by microfluidic pumps; mixing the correct amount of colorless ink with the cyan, magenta, or yellow inks to produce both the correct hue and tone scale for each colored pixel; and transferring the colored pixels of mixed ink to the reflective receiver to form colored pixels on the receiver.

12 Claims, 2 Drawing Sheets

CONTINUOUS TONE MICROFLUIDIC PRINTING

CROSS REFERENCE TO RELATED APPLICATIONS

Reference is made to commonly assigned U.S. patent application Ser. No. 08/699,955 filed Aug. 20, 1996 entitled "Cyan and Magenta Pigment Set"; U.S. patent application Ser. No. 08/699,962 filed Aug. 20, 1996 entitled "Magenta Ink Jet Pigment Set"; U.S. patent application Ser. No. 08/699,963 filed Aug. 20, 1996 entitled "Cyan Ink Jet Pigment Set", all by McInerney, Oldfield, Bugner, Bermel, and Santilli; U.S. patent application Ser. No. 08/790,131 filed Jan. 29, 1997 entitled "Heat Transferring Inkjet Ink Images" by Bishop, Simons, and Brick; U.S. patent application Ser. No. 08/764,379 filed Dec. 13, 1996 entitled "Pigmented Inkjet Inks Containing Phosphated Ester Derivatives" by Martin; and U.S. patent application Ser. No. 08/868,104 filed Jun. 3, 1997 entitled "Image Producing Apparatus For Microfluidic Printing" by Xin Wen, assigned to the assignee of the present invention. The disclosure of these related applications is incorporated herein by reference.

FIELD OF THE INVENTION

The present invention relates to printing continuous tone photographic quality images by microfluidic pumping of colored inks into paper.

BACKGROUND OF THE INVENTION

Microfluidic pumping and dispensing of liquid chemical reagents is the subject of three U.S. Pat. Nos. 5,585,069; 5,593,838; and 5,603,351, all assigned to the David Sarnoff Research Center, Inc. and hereby incorporated by reference. The system uses an array of micron sized reservoirs, with connecting microchannels and reaction cells etched into a substrate. Electrokinetic pumps include electrically activated electrodes within the capillary microchannels provide the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp 1792–1798 (1994). The chemical reagent solutions are pumped from a reservoir, mixed in controlled amounts, and them pumped into a bottom array of reaction cells. The array could be decoupled from the assembly and removed for incubation or analysis. When used as a printing device, the chemical reagent solutions are replaced by dispersions of cyan, magenta, and yellow pigment, and the array of reaction cells could be considered a viewable display of picture elements, or pixels, comprising mixtures of pigments having the hue of the pixel in the original scene. When contacted with paper, the capillary force of the paper fibers pulls the dye from the cells and holds it in the paper, thus producing a paper print, or reproduction, of the original scene.

One problem with this kind of printer is the rendering of an accurate tone scale. The problem comes about because the capillary force of the paper fibers remove all the pigment solution from the cell, draining it empty. If, for example, a yellow pixel is being printed, the density of the image will be fully yellow. However, in some scenes, a light, or pale yellow is the original scene color. One way to solve this problem would be to stock and pump a number of yellow pigments ranging from very light to dark yellow. Another way to solve the tone scale problem is to print a very small dot of dark yellow and leave white paper surrounding the dot. The human eye will integrate the white and the small dot of dark yellow leading to an impression of light yellow, provided the dot is small enough. This is the principle upon which the art of color halftone lithographic printing rests. It is sometimes referred to as area modulation of tone scale. However, in order to provide a full tone scale of colors, a high resolution printer is required, with many more dots per inch than would be required if the colors could be printed at different densities.

Another solution to the tone scale problem has been provided in the area of ink jet printers, as described in U.S. Pat. No. 5,606,351 by Gilbert A. Hawkins, the disclosure of which is hereby incorporated by reference. In an ink jet printer, the drop size is determined primarily by the surface tension of the ink and the size of the orifice from which the drop is ejected. The ink jet printer thus has a similar problem with rendition of tone scale. U.S. Pat. No. 5,606,351 overcomes the problem by premixing the colored ink with a colorless ink in the correct proportions to produce a drop of ink of the correct intensity to render tone scale. However, ink jet printers require a relatively high level of power to function, and they tend to be slow since only a few pixels are printed at a time (serial printing), in comparison to the microfluidic printer in which all the pixels are printed simultaneously (parallel printing).

SUMMARY OF THE INVENTION

An object of this invention is to provide a compact, low powered printer which would rapidly print a high quality continuous tone image.

A further object of this invention is to provide an rapid way to print a high quality continuous tone image.

Another object of this invention is to provide a compact, low power, portable printer.

These objects are achieved by a method for microfluidic printing continuous tone color pixels on a reflective receiver by using cyan, magenta, and yellow inks, comprising:

a) supplying a fourth, colorless ink along with the cyan, magenta, and yellow inks needed for color printing:

b) pumping the inks through capillary microchannels by microfluidic pumps;

c) mixing the correct amount of colorless ink with the cyan, magenta, or yellow inks to produce both the correct hue and tone scale for each colored pixel; and d) transferring the colored pixels of mixed ink to the reflective receiver to form colored pixels on the receiver.

ADVANTAGES

The present invention provides high quality continuous tone prints.

Another feature of the invention is that the printer is low power, compact, and portable.

Another feature of the invention is that the printing process is fast, because all the colored pixels can be printed simultaneously.

Another feature of the invention is that registration errors, banding, and other positional error defects are greatly reduced because all the colored pixels are printed simultaneously.

DETAILED DESCRIPTION OF THE INVENTION

The present invention is described in relation to a continuous tone printer. It will be understood by those skilled in the art that the term "continuous tone images" will include not only continuous tone images recorded from nature, but also computer generated images, graphic images, line art, text images and the like. It will also be understood that the term "colorless ink" refers to colorless or white fluids that do not absorb visible light when the colorless ink is transferred to a reflective receiver.

Figure 1:
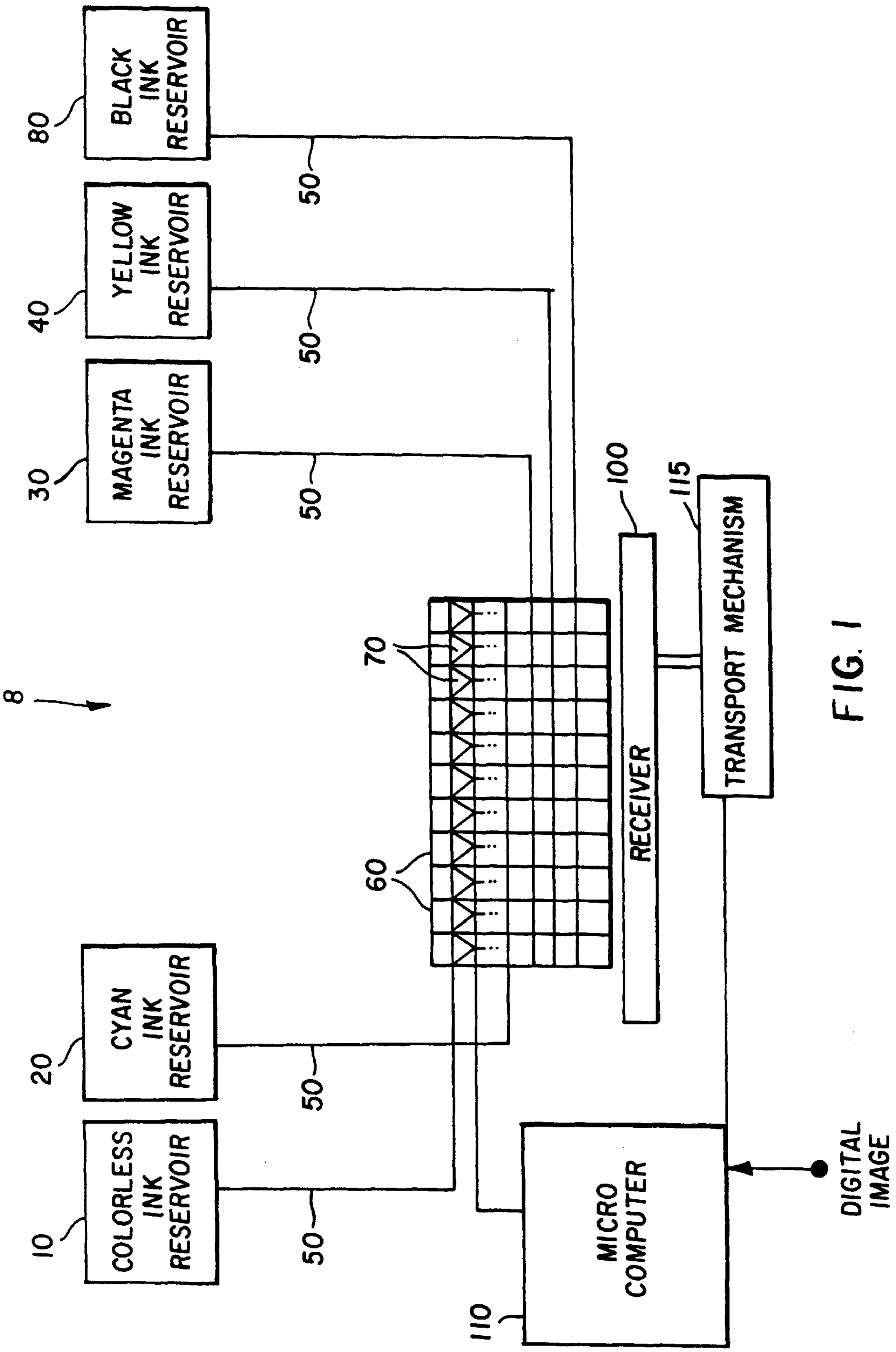
FIG. 1 is a partial schematic view showing a printing apparatus for pumping, mixing and printing pixels of ink onto a reflective receiver.
Figure 2:
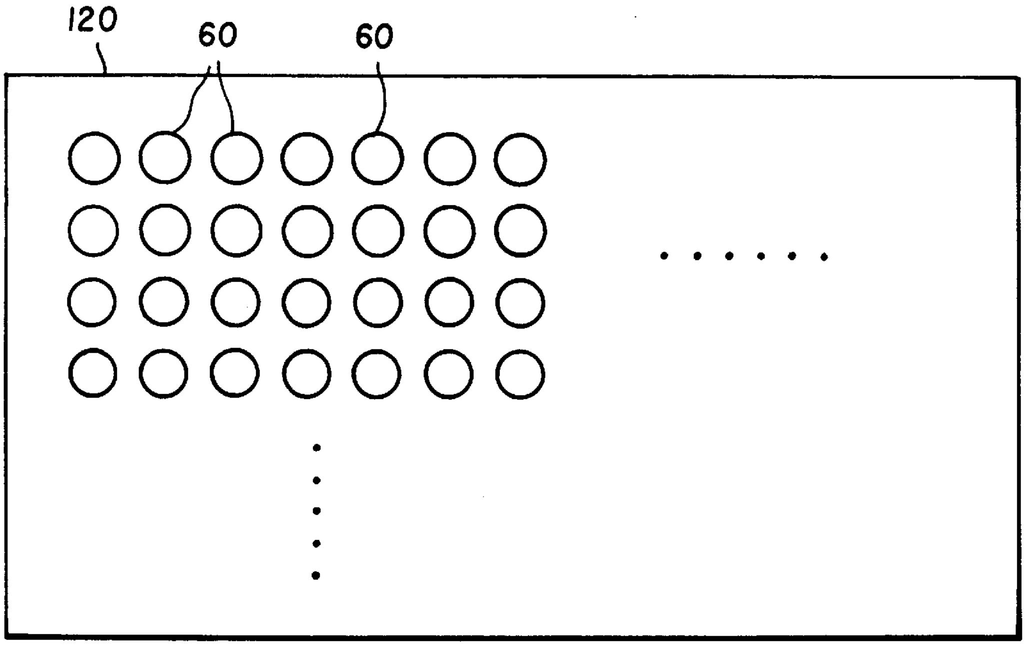
FIG. 2 is a top view of the mixing chambers in the apparatus of FIG. 1 described in the present invention.

Referring to FIG. 1, a schematic diagram is shown of a printing apparatus 8 in accordance with the present invention. Reservoirs 10, 20, 30, and 40 are respectively provided for holding colorless ink, cyan ink, magenta ink, and yellow ink. An optional reservoir 80 is shown for black ink. Microchannel capillaries 50 respectively connected to each of the reservoirs conduct ink from the corresponding reservoir to an array of ink mixing chambers 60. In the present invention, the ink mixing chambers 60 deliver the ink directly to a receiver; however, other types of ink delivery arrangements can be used such as microfluidic channels, and so when the word chamber is described, it will be understood to include those arrangements. The colored inks are delivered to ink mixing chambers 60 by electrokinetic pumps 70. The amount of each color ink is controlled by microcomputer 110 according to the input digital image. For clarity of illustration, only one electrokinetic pump 70 is shown for the colorless ink channel. Similar pumps are used for the other color channels, but these are omitted from the figure for clarity. Finally, a receiver 100 is transported by a transport mechanism to come in contact with the microfluidic printing apparatus. The receiver 100 accepts the ink and thereby produce the print FIG. 2 depicts a top view of an arrangement of mixing chambers 60 shown in FIG. 1. Each ink mixing chamber 60 is capable of producing a mixture of inks of different colors having any color saturation, hue, and lightness within the color gamut provided by the set of inks used in the apparatus. This results in a continuous tone photographic quality image on the reflective receiver 100. As shown in FIG. 1, there is provided a microcomputer 110. which receives a digital image. The digital image includes a number of digital pixels which represents a continuous tone colored image. The microcomputer 110 is connected to the electrokinetic pumps 70 and controls their operation. More particularly, it causes each pump to meter the correct amount of inks into each of the ink mixing chambers 60 to provide both the correct hue and tone scale for each colored pixel. Another function of the microcomputer is to arrange the array of image pixels in the proper order so the image will be right reading to the viewer. The microcomputer includes a matrix, or look-up table, which is determined experimentally, of all the colors which can be achieved by varying the mixture of inks. When a data for a particularly pixel (8 bits per color plane) is inputted, the output from the look-up table will control signals to the electrokinetic pumps to meter out the correct amount of each ink. Also provided is a transport mechanism 115 which is adapted to move the receiver 100 into and out of engagement with the ink mixing chambers 60 under the control of the microcomputer 110. After the ink mixing chambers 60 have the appropriate amount of mixed ink, the microcomputer 110 signals the transport mechanism 115 to move the receiver 100 into engagement with the ink mixing chambers 60 for ink transfer.

The colored inks used in this invention are dispersions of colorants in common solvents. Examples of such inks are found is U.S. Pat. No. 5,611,847 by Gustina, Santilli, and Bugner. Inks are also be found in the following commonly assigned U.S. patent application Ser. No. 08/699,955 filed Aug. 20, 1996 entitled "Cyan and Magenta Pigment Set"; U.S. patent application Ser. No. 08/699,962 filed Aug. 20, 1996 entitled "Magenta Ink Jet Pigment Set"; U.S. patent application Ser. No. 08/699,963 filed Aug. 20, 1996 entitled "Cyan Ink Jet Pigment Set", all by McInerney, Oldfield, Bugner, Bermel, and Santilli; and in U.S. patent application Ser. No. 08/790,131 filed Jan. 29, 1997 entitled "Heat Transferring Inkjet Ink Images" by Bishop, Simons, and Brick; and U.S. patent application Ser. No. 08/764,379 filed Dec. 13, 1996 entitled "Pigmented Inkjet Inks Containing Phosphated Ester Derivatives" by Martin, the disclosures of which are incorporated by reference herein. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention. The colorless ink of this invention can take a number of different forms, which will suggest themselves to those skilled in the art. If the colored inks are water soluble, then the colorless ink can indeed be water.

The microchannel capillaries, ink mixing chambers 60 and electrokinetic pumps are all fully described in the patents listed above.

The reflective receiver 100 can be common paper having sufficient fibers to provide a capillary force to draw the ink from the mixing chambers into the paper. Synthetic papers can also be used. The receiver can have a coated layer of polymer which has a strong affinity, or mordanting effect for the inks. For example, if a water based ink is used, the colorless ink can be water, which also acts as a solvent, and a layer of gelatin will provide an absorbing layer for these mixed inks. In a preferred embodiment of the invention, an exemplary reflective receiver is disclosed in commonly assigned U.S. Pat. No. 5,605,750 to Romano et al.

The typical printing operation in the present invention involves the following steps. First the microcomputer 110 receives a digital image or digital image file consisting of electronic signals in which the color code values are characterized by bit depths of an essentially continuous tone image, for example, 8 bits per color per pixel. Based on the color code values at each pixel in the digital image, which define the lightness, hue, and color saturation at the pixel, the microcomputer 110 operates the electrokinetic pumps to mix the appropriate amount of colored inks and colorless inks in the array of ink mixing chambers 60. Stated differently, the corresponding mixed inks in each chamber 60 are in an amount corresponding to a code value for a digital colored pixel. The mixture of inks, which has the same hue, lightness, and color saturation as the corresponding pixel of the original image being printed, is held in the mixing chamber by the surface tension of the ink. The reflective receiver 100 is subsequently placed by the transport mechanism 115 under the control of the microcomputer 110 in contact with the ink meniscus of the ink mixing chamber 60 within the printer front plate 120. The mixture of inks contained in the mixing chamber 60 is then drawn into the reflective receiver by the capillary force of the paper fibers, or by the absorbing or mordanting force of the polymeric layer coated on the reflective receiver. The receiver is peeled away from the ink mixing chambers in the printer front plate immediately after the time required to reach the full density of the print. The receiver cannot be left in contact with the front plate for too long a time or the density of the print will be higher than desired. One important advantage of the present invention is the reduction of the printing image defects that commonly occur when the cyan, magenta, and yellow inks are printed in separate operations. Misregistration of the apparatus often leads to visible misregistration of the color planes being printed. In this invention, all the color planes are printed simultaneously, thus eliminating such misregistration.

Ink from the black ink reservoir 80 can be included in the colored in mixtures to improve the density of dark areas of the print, or can be used alone to print text, or line art, if such is included in the image being printed.

Figure 3:
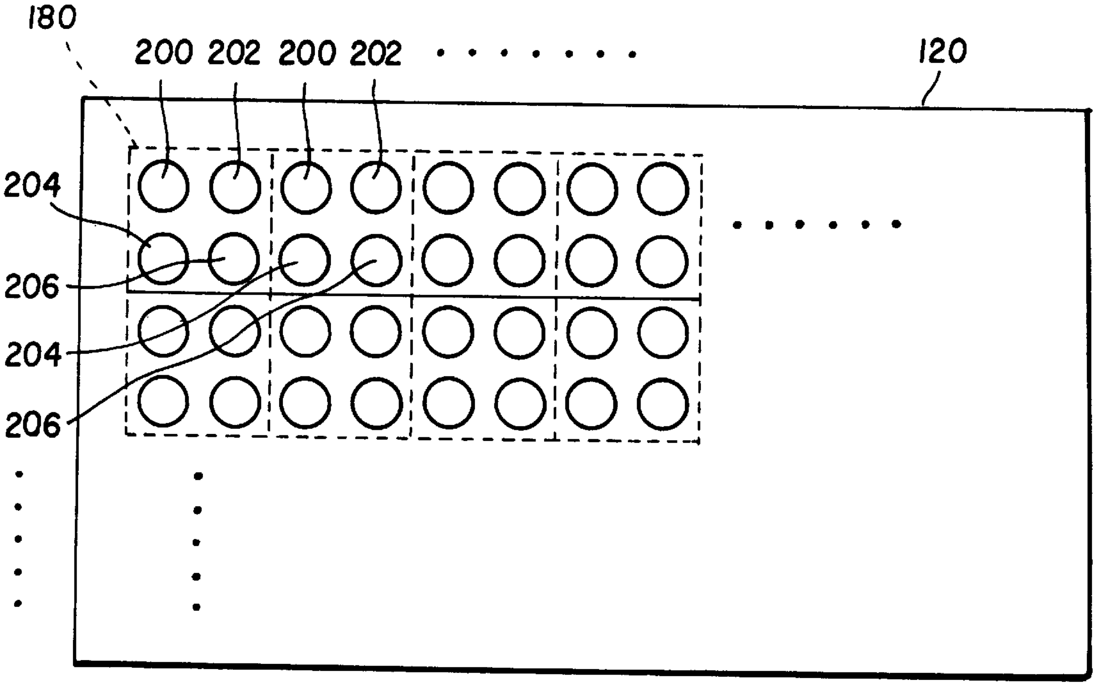
FIG. 3 is a top view of an alternate pattern of mixing chambers which can be used in the printing apparatus of FIG. 1 in the present invention.

In an alternate scheme for printing with this invention, shown in FIG. 3, the ink mixing chambers 60 are divided into four groups cyan ink mixing chamber 200; magenta ink mixing chamber 202; yellow ink mixing chamber 204; and black ink mixing chamber 206. Each chamber is connected only to the respective ink color reservoir and to the colorless ink reservoir 10. For example, the cyan ink mixing chamber 200 is connected to the cyan ink reservoir and the colorless ink reservoir so that cyan inks can be mixed to any desired lightness. When the inks are transferred to the reflective receiver 100 some of the inks can mix and blend on the receiver. Inasmuch as the inks are in distinct areas on the receiver, the size of the printed pixels should be selected to be small enough so that the human eye will integrate the color and the appearance of the image will be that of a continuous tone photographic quality image.

The invention has been described in detail with particular reference to certain preferred embodiments thereof, but it will be understood that variations and modifications can be effected within the spirit and scope of the invention.

PARTS LIST

8 microfluidic printing system
10 colorless ink reservoir
20 cyan ink reservoir
30 magenta ink reservoir
40 yellow ink reservoir
50 microchannel capillaries
60 ink mixing chambers
70 electrokinetic pumps
80 black ink reservoir
100 reflective receiver
110 microcomputer
115 transport mechanism
120 printer front plate
180 full color pixel
200 cyan ink mixing chamber
202 magenta ink mixing chamber
204 yellow ink mixing chamber
206 black ink mixing chamber

What is claimed is:

1. A method for microfluidic printing continuous tone color pixels on a reflective receiver by using cyan, magenta, and yellow inks, comprising:

a) supplying a colorless ink along with the cyan, magenta, and yellow inks needed for color printing;

b) pumping the inks through capillary microchannels by microfluidic pumps;

c) mixing a correct amount of colorless ink with the cyan, magenta, or yellow inks to produce both the correct hue and tone scale for each colored pixel; and d) transferring the colored pixels of mixed ink to the reflective receiver to form colored pixels on the receiver.

2. The method of claim 1 wherein the receiver includes a polymeric layer which has an affinity for ink.

3. The method of claim 1 wherein the colored inks include black ink.

4. The method of claim 1 wherein the colorless ink is a solvent for the cyan, magenta, and yellow inks.

5. The method of claim 4 wherein the colorless ink is a solvent for the cyan, magenta, yellow, and black inks.

6. A method for microfluidic printing continuous tone color pixels on a reflective receiver by using cyan, magenta, and yellow inks, comprising:

a) supplying a colorless ink along with the cyan, magenta, and yellow inks needed for color printing:

b) selectively pumping the inks through capillary microchannels by microfluidic pumps to an array of mixing chambers;

c) mixing selected ones of the colored inks in the mixing chambers with the colorless inks produce both a correct hue and tone scale for each colored pixel, which is a mixture of inks; and d) simultaneously transferring the colored pixels of mixed ink from the array of mixing chambers to the reflective receiver to form colored pixels on the receiver.

7. The method of claim 6 wherein the receiver includes a polymeric layer which has an affinity for ink.

8. The method of claim 6 wherein the colored inks include black ink.

9. The method of claim 6 wherein the colorless ink is a solvent for the cyan, magenta, and yellow inks.

10. The method of claim 9 wherein the colorless ink is a solvent for the cyan, magenta, yellow, and black inks.

11. Apparatus for microfluidic printing continuous tone color pixels on a reflective receiver by using cyan, magenta, and yellow inks, comprising:

a) a plurality of reservoirs respectively containing cyan, magenta, yellow, and colorless inks needed for color printing:

b) means for pumping the inks from said reservoirs through corresponding capillary microchannels to an array of mixing chambers to mix selected ones of the colored inks with the colorless inks produce both a correct hue and tone scale for each colored pixel, which is a mixture of inks; and c) means for causing simultaneously transferring the colored pixels of mixed ink from the array of mixing chambers to the reflective receiver to form colored pixels on the receiver.

12. Apparatus for microfluidic printing continuous tone color pixels on a reflective receiver by using cyan, magenta, and yellow inks to form a colored image corresponding to a digital image, comprising:

a) a plurality of reservoirs respectively containing cyan, magenta, yellow, and colorless inks needed for color printing:

b) means for pumping the inks from said reservoirs through corresponding capillary microchannels to an array of mixing chambers to mix selected ones of the colored inks with the colorless inks produce both a correct hue and tone scale for each colored pixel, which is a mixture of inks;

c) means for simultaneously transferring the colored pixels of mixed ink from the array of mixing chambers to the reflective receiver to form colored pixels on the receiver; and d) means for selectively operating the pumping means to cause the desired mixture of inks for each colored pixel in accordance with the digital image.

* * * * *